No. 734,983. PATENTED JULY 28, 1903.
J. T. SMITH.
MACHINE FOR LOADING OR UNLOADING GRAIN.
APPLICATION FILED MAY 26, 1902.
NO MODEL. 5 SHEETS—SHEET 5.
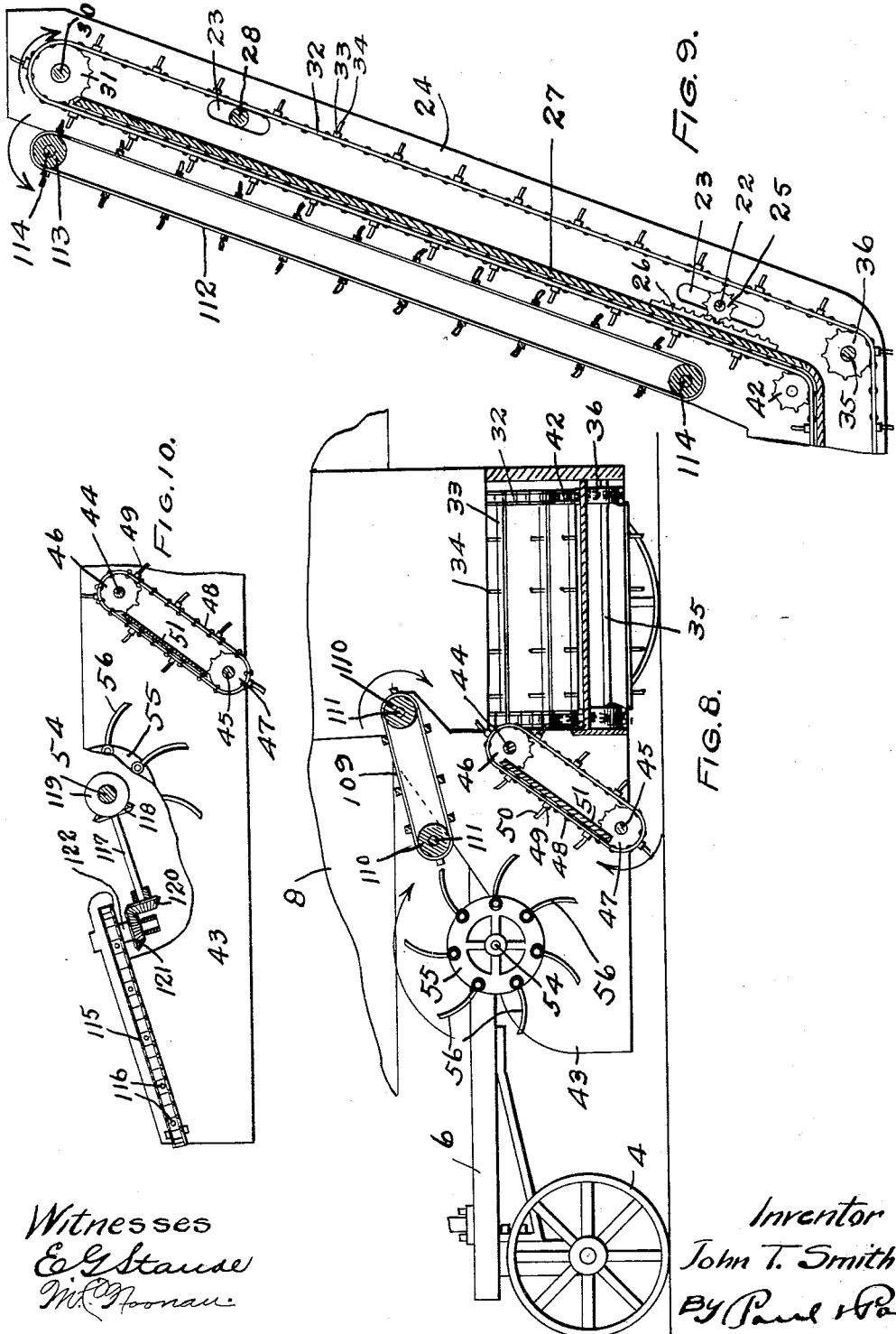
Witnesses
Inventor
John T. Smith
By Paul & Paul
his attorneys No. 734,983. Patented July 28, 1903.

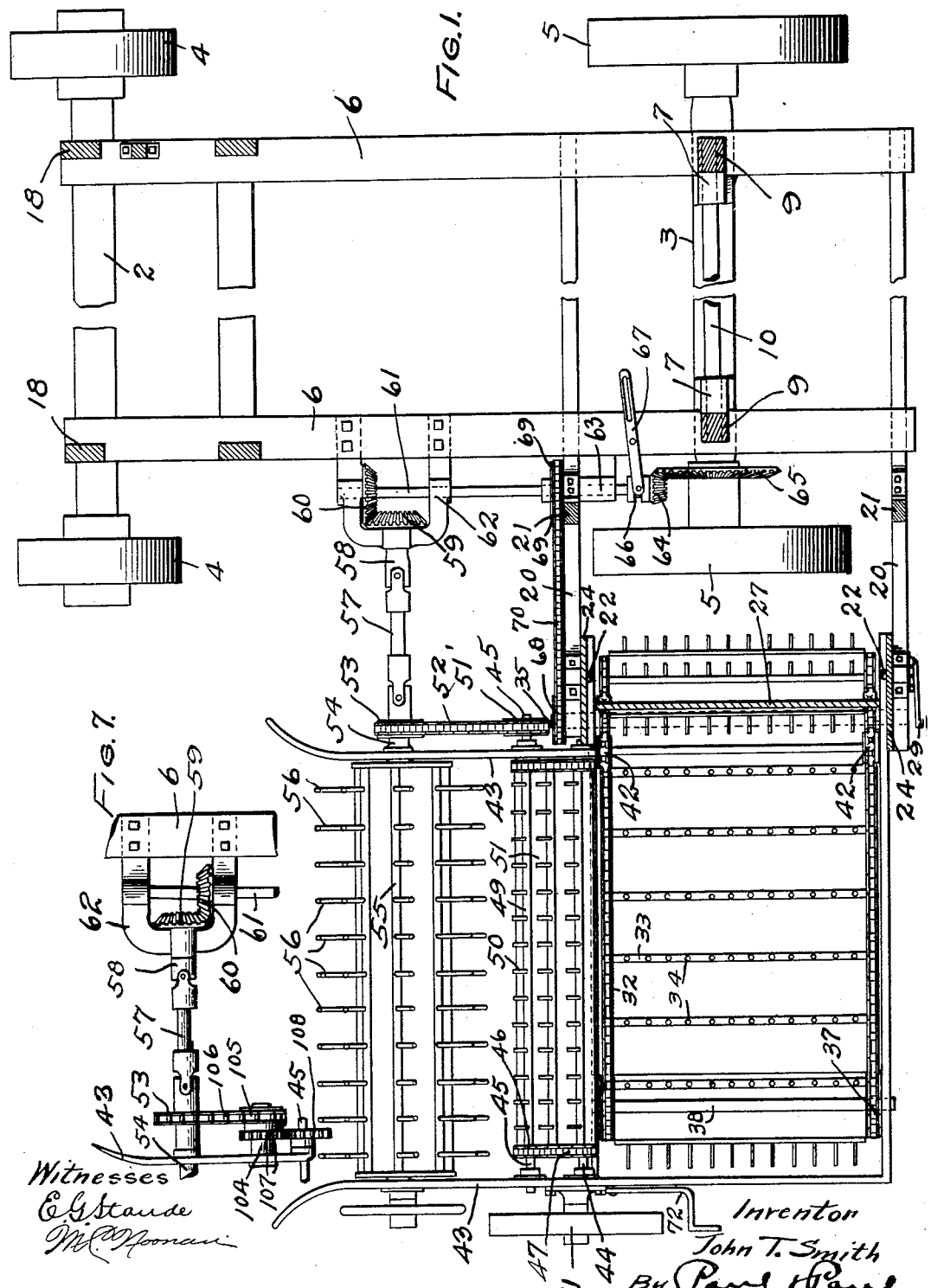

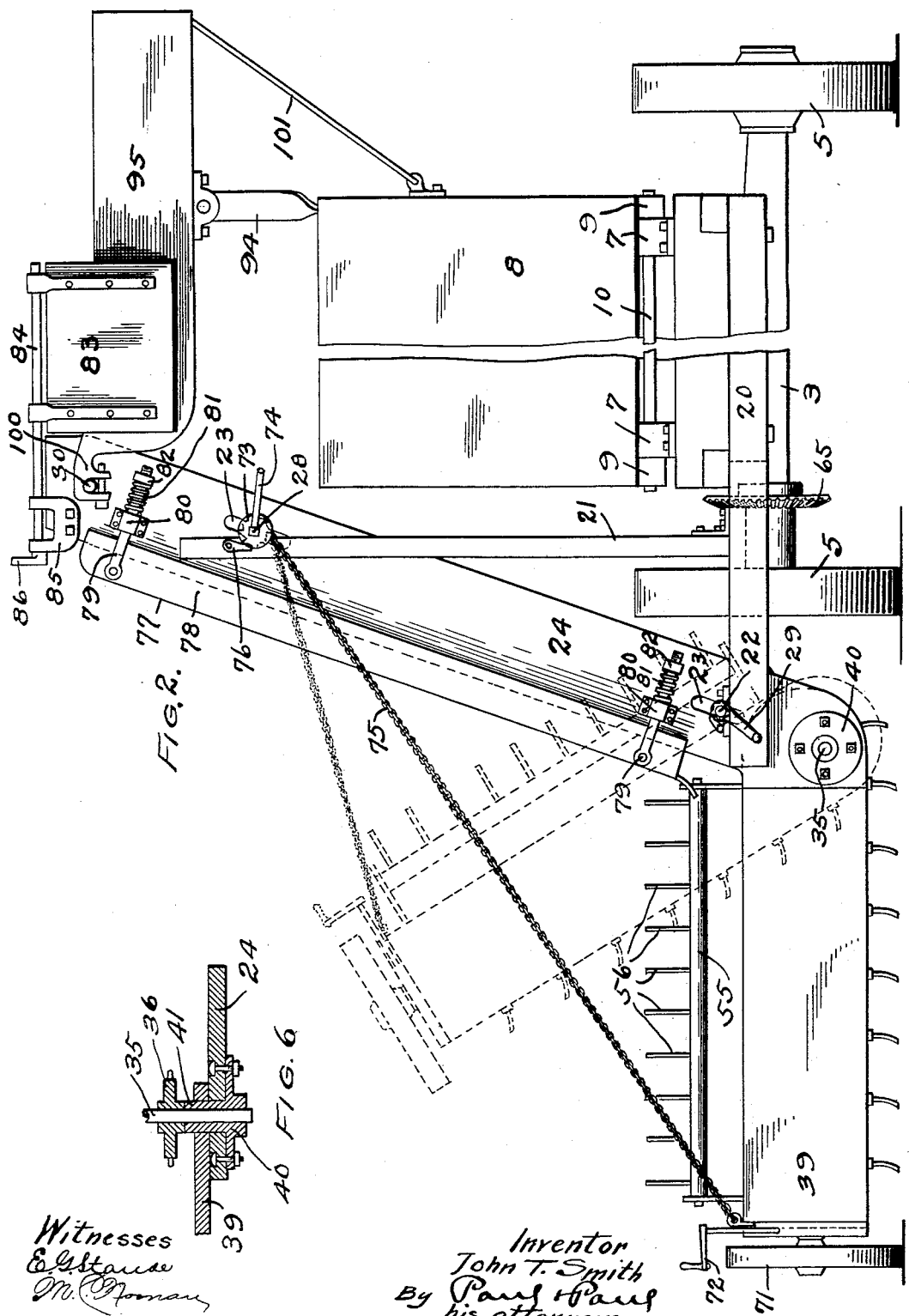

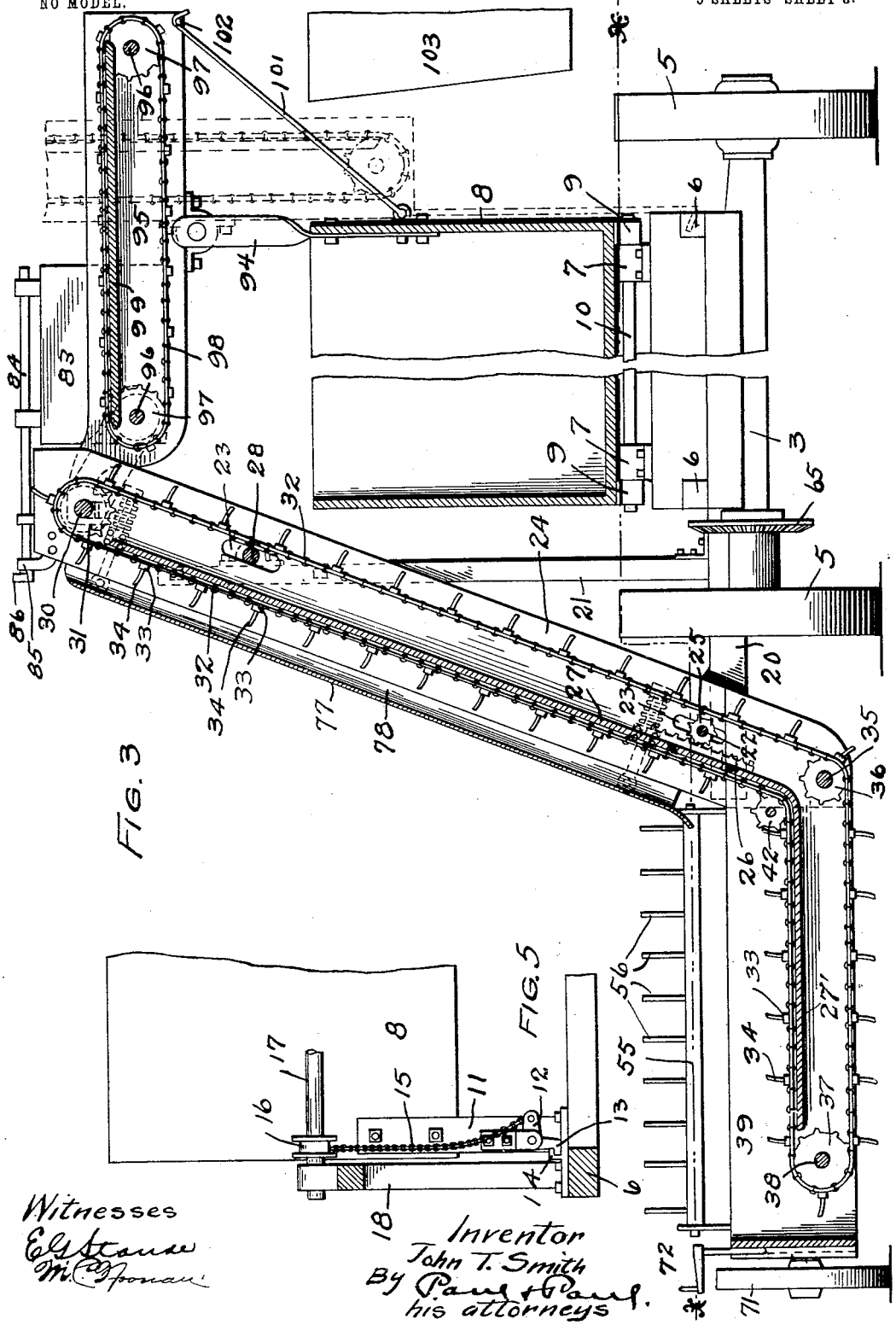

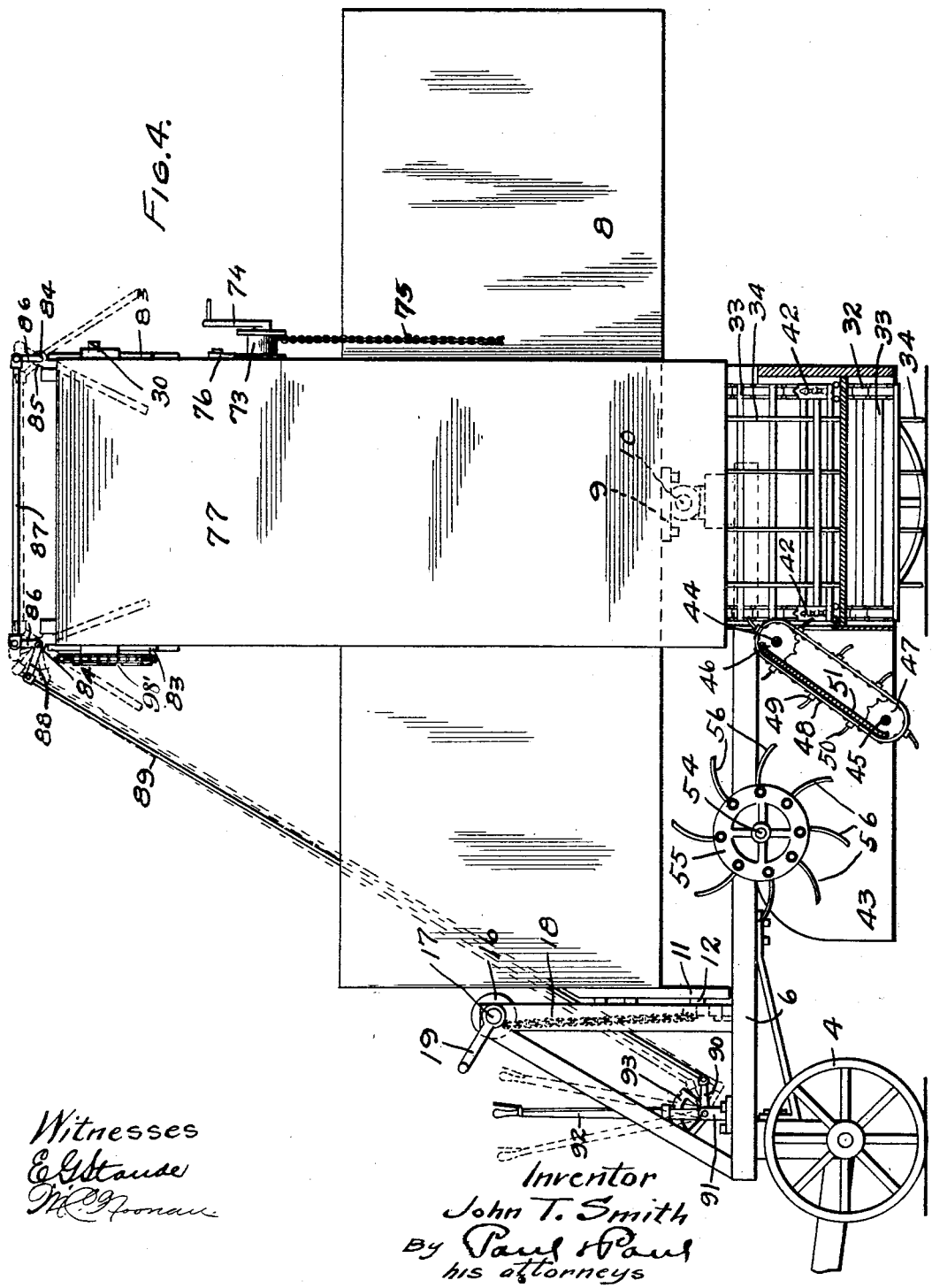

UNITED STATES PATENT OFFICE.

JOHN T. SMITH, OF HERON LAKE, MINNESOTA.

MACHINE FOR LOADING OR UNLOADING GRAIN.

SPECIFICATION forming part of Letters Patent No. 734,983, dated July 28, 1903.

Application filed May 26, 1902. Serial No. 108,999. (No model.)

*To all whom it may concern:*

Be it known that I, JOHN T. SMITH, of Heron Lake, Jackson county, Minnesota, have invented certain new and useful Improvements in Machines for Loading or Unloading Grain, of which the following is a specification.

In operating a thresher six or eight teams and a large crew of men are usually employed in gathering up the shocks of grain and hauling them to the thresher, where they are unloaded within convenient handling distance of the thresher crew, and to keep the thresher running at full speed the men and the teams are obliged to work rapidly, especially as the grain is loaded and unloaded by hand. This manner of collecting the grain for a thresher is not only laborious and expensive, but through the inability to get a sufficient number of teams it is frequently difficult to keep the thresher in operation at its full capacity.

The object, therefore, of my invention is to effect an economy of labor and time in gathering the grain and also reduce the number of teams employed, and consequently the expense of running a thresher, by providing an economical apparatus for gathering up and discharging, without handling, either loose grain or bound bundles.

The invention consists generally in various constructions and combinations, all as hereinafter described, and particularly pointed out in the claims.

In the accompanying drawings, forming part of this specification, Figure 1 is a sectional view on the line x x of Fig. 3. Fig 2 is a rear view of the machine. Fig. 3 is a similar view partially in section. Fig. 4 is a section through the horizontal portion of the elevator-belt looking toward the side of the machine. Fig. 5 is a detail of the mechanism for locking and releasing the wagon-body. Fig. 6 is a detail in section of the hinge between the inclined and horizontal sections of the elevator. Fig. 7 illustrates a gearing mechanism for driving the gathering devices in the opposite direction from that shown in Fig. 1. Fig. 8 is a view, partially in section, showing a modified construction of the grain-gathering mechanism. Fig. 9 is a vertical section of the grain-elevator and a modified form of mechanism for holding the grain thereon. Fig. 10 is a detail view showing the gathering-chains in front of the drum.

In the drawings, 2 and 3 represent, respectively, the forward and rear axles, 4 and 5 the wheels, and 6 a wagon bed or frame provided with brackets 7, hinged to the bottom of the wagon-body 8 by means of lugs 9 and a rod 10. The brackets 7 are preferably arranged over the rear axle at a point midway between the ends of the wagon-body, so that the rear end thereof will overhang the rear axle and be capable of tilting to discharge its contents. The forward end of the wagon-body is provided with a leg 11, which engages the wagon-frame and limits the forward tilting movement of said body. Upon said leg I pivot a bell-crank 12, having a hook 13 on one arm to engage a stop 14 on said frame to prevent premature tilting of said body, and a chain 15 is connected to the other arm of said crank and to a drum 16, secured on a shaft 17, that is mounted in bearings in a frame 18. A crank 19 is provided for said shaft, by means of which the person in charge of the machine may wind up the chain on the drum, operate the bell-crank to unlock the wagon-body, and then by continued winding tilt said body to the desired angle.

Upon the frame 6 I provide laterally-extending bars 20, one in front and the other behind the rear wheels, and upon said bars I arrange upright standards 21. Upon the bars 20 I provide bearings for a shaft 22, which projects through longitudinal slots 23 in the sides of an upwardly-inclined elevator-casing 24, located between the bars 20, and upon said shaft I provide a pinion 25, adapted to engage the teeth of a rack 26, secured to a floor 27, arranged between and connecting the sides of said casing. The sides of the casing are provided near their upper ends with slots corresponding to those described to receive a guide shaft or rod 28, mounted in bearings on the standards 21. A crank 29 is provided on the shaft 22, by means of which the elevator-casing may be raised or lowered to vary its distance from the ground. Near the upper ends of the casing 24 I provide a shaft 30, whereon sprockets 31 are secured, over which an elevator-belt passes, comprising chains 32, connected at intervals by slats 33, provided with a series of slightly-curved hooks 34. At the lower end of the casing 24 is a shaft 35, provided with sprockets 36, around which said chains pass to sprockets 37 on a shaft 38, that is mounted in bearings in a horizontal section 39, hinged on the shaft 35 of the casing and provided with a continuation 27' of the floor 27. Any suitable means may be provided for hinging the ends of these elevator-sections together; but I prefer to provide disks 40, secured by bolts or other suitable means to the sides of the casing 24 and having hubs 41 provided with central openings to receive the shaft 35 and extending through the lapped ends of the two sections of the casing. The sprockets 36 are preferably secured to the shaft 35 near the hubs 41 and allow the elevator-chains to adjust themselves to the tilted or horizontal positions of the section 39. Above the floor 27 and near the hinged connection of the casing-sections I provide idle rolls 42, which hold the elevator-chains down upon the floor. The ends 43 of the casing 39 extend forward beyond the sides thereof and have bearings for shafts 44 and 45, that are substantially at right angles to the shafts over which said elevator-chains operate. Upon these shafts 44 and 45 I provide sprockets 46 and 47, connected by chains 48, between which at intervals are slats 49, having pins 50, forming an auxiliary elevator-belt to operate over a floor 51. The shaft 45 projects beyond the end of the casing on the side next to the wagon and is provided with a sprocket 51', connected by a chain 52 with a similar sprocket 53 on a shaft 54, also mounted in bearings in said ends 43.

Upon the shaft 54 is a revolving gathering cylinder or drum 55, provided with a series of curved fork-like fingers or hooks 56, that are adapted to pick up the bundles of grain and throw them over upon the elevator. The shaft 54 is connected by a coupling 57 with a stub-shaft 58, carrying a gear 59, meshing with a similar gear 60 on a shaft 61, mounted in bearings in a bracket 62 on the frame 6 and in a bearing 63 near the rear axle. Upon the shaft 61 is a pinion 64, meshing with a beveled gear 65 on the rear wheel, and a clutch mechanism 66 is connected with said pinion and slidable therewith on said shaft. I prefer to arrange the gearing so that the gatherer will travel at the same or a higher speed than the wagon-wheels, to insure the picking up of the bundles. A lever 67, pivoted on said frame, engages said clutch and when operated moves said pinion into or out of engagement with the gear 65 and through the shaft 61, the gears 59 and 60, and their connections operates the revolving drum and the shafts 44 and 45 and the carrier or elevator belt thereon. The shaft 35 extends through one end of the casing 24 and is provided with a sprocket 68, connected with a similar sprocket 69 on the shaft 61 by a chain 70. By this means the grain-elevator is operated to lift the bundles or loose grain up above the wagon-body and discharge the same therein.

The horizontal section of the grain-elevator and revolving drum 55 and the short carrier-belt between said drum and elevator constitute the horizontal portion of the grain-loading apparatus and are adapted to travel along the desired distance above the ground at the side of the machine, being supported on the outside by a caster-wheel 71, provided with the usual crank mechanism 72 for raising and lowering the wheel to adjust the outer side of the grain-gathering mechanism the desired distance above the ground. To raise and lower the horizontal portion of said gathering mechanism, I prefer to provide a drum 73 on the shaft 28 and provide a crank 74 on said shaft, which is idle, acting only as a guide for the upper portion of the elevator-casing and connecting said drum with the outer end 43 of the casing by a chain 75. The revolution of the drum 73 will wind up the chain and gradually elevate the horizontal portion of the elevator-casing, as indicated by dotted lines in Fig. 2, until the pivoted section has been tilted to the desired angle, when it may be locked by any suitable mechanism, such as a dog 76, engaging teeth on the drum 73. I prefer to cover the front of the inclined portion of the elevator-casing by a plate 77, having side boards 78, whereon bolts 79 are pivoted and slidable in guides 80 on the boards 24 and provided with springs 81 between said guides and nuts 82. The nuts may be adjusted on their bolts to regulate the tension of the springs and increase or decrease the pressure of the plate 77 upon the grain carried up by the elevator. Ordinarily, however, I prefer to only apply sufficient pressure to the grain to prevent it from falling back as it is being elevated.

The elevator-casing projects above the side of the wagon-body in position to discharge the loose grain or bound bundles therein, and to direct the grain toward either the forward or rear end of the body and dispense with the services of a man on the load, I provide swinging guide-boards 83, suspended upon rods 84, that are secured on brackets 85 at the top of the casing and on each side thereof. The rods 84 are provided with cranks 86, connected by a rod 87, and a crank 88 on one side of the rods 84 is connected by a rod 89 with a crank 90, mounted on a standard 91 at the forward end of the machine and provided with a hand-lever 92, having a locking device that is movable over a quadrant 93. The reciprocation of this lever will operate the boards 83, swinging them forward or back to direct the grain into the forward end of the box or toward the rear of the same, as desired.

It may be sometimes desirable to utilize the elevating part of the machine without discharging the grain so elevated into the wagon-box, but into another wagon or receptacle placed alongside of the same. I therefore provide a standard 94 on the wagon-box and mount thereon a carrier-casing 95, wherein shafts 96 are arranged, having sprockets 97 for a carrier-belt 98, that operates over a floor 99. One end of the casing 95 is provided with a hook device 100 to engage the shaft 30, while the opposite end is held by a hook 101, pivoted on the wagon-body and engaging a rod 102 on said casing. When it is desired to carry the grain over the wagon-body, the carrier-casing 95 is adjusted to the position shown in Figs. 2 and 3, where it will receive all the grain, whether loose or bound, from the elevator and carry it across the wagon-body and discharge it into another wagon or receptacle 103 beneath. I prefer to drive this supplemental carrier by a chain 98' from a sprocket on the shaft 30 to a similar sprocket on the shaft 96. (See Figs. 3 and 4.) When not in use, the carrier 95 is tilted to the position indicated by dotted lines in Fig. 3, whereupon the grain will be discharged directly into the wagon-body. The elevator-belt will gather up and discharge into the tight-bottomed body all the loose seeds shaken out by the gathering operation.

In gathering up loose grain it is desirable to drive the picking-up drum or gatherer in the opposite direction from which it is driven to pick up bound bundles. I therefore arrange to place a gear 60 on the opposite side of the gear 59, as shown in Fig. 7, and provide a stud 104 on the wall 43 and connect a sprocket 105 on said stud with a similar sprocket on the shaft 54 by a chain 106 and arrange a gear 107 on said stud to engage a gear 108 on the shaft 45. With this simple change of gearing the gathering-drum will be reversed in its movement and the machine adapted to pick up loose grain, while the shafts 44 and 45 and their carrier-belts will be driven in the same direction as before.

In Figs. 8 and 9 I have shown a modification in the construction, which consists in providing a carrier-belt 109, operating over wheels or pulleys 110 on shafts 111, that are mounted in bearings in the casing and driven preferably from the shaft 44. This short carrier is adapted to receive the bound bundles that are gathered up by the revolving drum and insure their prompt delivery to the elevator; otherwise some of these bundles might fall down between the drum and the short elevator 50 and either not be delivered at once to the elevator or in some cases clog up the machine.

In Fig. 9 I have shown a modification of the apparatus for holding the grain on the elevator, which consists in providing a slatted belt 112, operating over wheels 113, said wheels being supported on shafts 114, having bearings in the side wall of the elevator-casing.

In Fig. 10 I have shown gathering-chains 115, which I may prefer to mount on the casing 43 in front of the revolving gatherer-drum and at each end of the same. These chains are upwardly inclined, as indicated, and are provided with fingers 116, that are adapted to engage the bundles of grain and prevent them from toppling over to the side. The revolving drum may gather up the bundles without their toppling over; but in case it does not I can arrange the gatherer-chains to first engage the bundles and hold them in their proper position until lifted and thrown upon the elevator by the fingers of the drum. These chains may be driven in any suitable way; but I prefer to provide a shaft 117 on the casing 43 at each end of the drum and mount a gear 118 on said shaft to mesh with a gear 119 on the drum-shaft. A similar gear 120 at the opposite end of the shaft 116 engages a gear 121 on a shaft 122 on said casing, and said shaft 122 carries a sprocket over which the chain passes to a similar sprocket provided at the forward end of the casing.

The operation of my improved grain-loading apparatus is as follows: The machine is drawn across the field, and as the speed of the gathering-drum is equal to or greater than that of the drive-wheel of the machine the drum-fingers will, as the machine approaches a shock, engage the sides of the bundles, pick them up, and throw them upon the horizontal portion of the elevator. As the drum moves considerably faster in its revolution than the wheels of the machine, each bundle will be picked up and the entire shock thrown upon the elevator without stopping; but should any of the bundles by accident escape the fingers of the gatherer they will be caught up by the fingers of the short carrier or auxiliary elevator in the rear of the same and quickly elevated thereby and thrown upon the elevator proper. The fingers of the bundle-gatherer operate in substantially the same way as the tines of a fork, their movement in engaging and lifting a bundle being similar to the movement made by a fork in lifting and pitching a bundle.

The speed of the bundle-gatherer will be such, compared with that of the wagon, that generally all the bundles will be picked up by the gatherer-fingers and thrown upon the elevator, provision being made, as heretofore referred to, for catching any bundle that might by accident escape the fingers of the gatherer. In loading loose grain I prefer to drive the gatherer in the opposite direction from that shown in Fig. 8 of the drawings and have the fingers coöperate with the shorter fingers of the auxiliary belt to gather up the loose grain and direct it to the elevator-belt.

I may without making any material change in the construction of my invention provide an elevator-belt which will convey the seed shaken out by the straw up to and discharge it into the wagon-box.

I claim as my invention—

1. The combination, with a wheeled frame, of a tilting rectangular wagon-body supported on the rear wheels, a grain-elevator provided at one side of said body and comprising a horizontal section and an upwardly-inclined section overhanging one side of said body, a wheel supporting the outer side of said horizontal section, a revolving overshot drum or gatherer provided in advance of said horizontal section and adapted to gather up the bundles of grain and deposit them thereon, and a suitable driving mechanism between said revolving drum, said elevator-belt and the wagon-wheel.

2. The combination, with a wheeled frame and a tilting body or box thereon, of a grain-elevator supported on said frame at one side of said box and comprising an upwardly-inclined section and a tilting horizontal section, a revolving drum or gatherer provided in advance of said horizontal section and adapted to gather up the grain and throw it thereon, means for driving said gatherer and said belt, and means for tilting said horizontal section and said gatherer to an inoperative position.

3. The combination, with a wheeled frame, of a grain-elevator provided at one side of said frame and comprising an inclined and a horizontal section, the former overhanging said frame and the latter being near the ground-line, a revolving overshot drum provided in advance of said horizontal section and at a greater distance from the ground and having a series of curved pick-up fingers arranged to engage the bundles standing in the shocks and toss them over upon said horizontal section, and said drum operating at a higher speed than the wheels of said frame.

4. The combination, with a wheeled frame, of an upwardly-inclined elevator-casing, a horizontal casing hinged to said inclined casing, an elevator-belt provided in said casings, means for swinging said horizontal casing to an inoperative position, a revolving grain-gatherer mounted on said horizontal casing and adapted to deliver the grain upon said elevator-belt, and means for driving said belt and said gatherer.

5. The combination, with a wheeled frame, of a grain-elevator having an upwardly-inclined and horizontal section, a revolving overshot grain-gatherer provided in advance of said horizontal section and having a series of pick-up fingers arranged to engage the bundles of grain and toss them upon said horizontal section, an auxiliary elevator-belt provided between said horizontal section and said gatherer and operating at an incline, its revolving end being near the ground to pick up the bundles missed by said gatherer, and means for driving said elevator, said gatherer and said belt.

6. The combination, with a wheeled frame and a tilting wagon-box thereon, of an inclined elevator-casing provided at one side of said box, a horizontal section hinged to the lower end of said casing, a carrier-belt provided in said casings, a grain-gatherer arranged in advance of said horizontal section and adapted to deliver the grain thereto, and means for driving said elevator-belt and said gatherer, and means for raising or lowering said inclined and said horizontal section.

7. The combination, with a wheeled frame, and a rectangular wagon-box thereon, of a grain-elevator overhanging one side of said box at a point intermediate to its ends and adapted to receive the loose or bound bundles of grain, said elevator comprising an inclined and a horizontal section, a revolving overshot gathering device provided in advance of said horizontal section and having a series of fingers to engage the bundles of grain, and oscillating guides provided over said box on each side of the discharge end of said elevator, and whereby the grain is directed toward the forward or rear end of said wagon-box.

8. The combination, with a wheeled frame and a tilting wagon-box thereon, of an elevator-casing provided at one side of said box and consisting of an inclined section and a horizontal section hinged thereto, a toothed carrier-belt provided in said inclined and horizontal sections and adapted to elevate the grain and discharge it into said box, a revolving gatherer having a series of fingers adapted to pick up the bound bundles of grain and toss them upon the horizontal portion of said elevator-belt, and an auxiliary elevator-belt provided between said gatherer and the horizontal section of said first-named belt.

9. The combination, with a wheeled frame of a grain-elevator comprising an upwardly-inclined casing and a horizontal casing hinged thereto, a conveyer-belt having a series of fingers provided in said casings, means overhanging said inclined casing for holding the grain on the belt while passing therethrough, a revolving gatherer provided with a series of fingers mounted in bearings in said horizontal casing and in advance of the same and adapted to pick up the bundles of grain and throw them upon said elevator-belt, means for driving said gatherer and said elevator-belt, and means for tilting said horizontal casing and said gatherer to an inoperative position.

10. The combination, with a wheeled frame and a wagon-box thereon, of a grain-elevator provided at one side of said box and consisting of an inclined and a horizontal section, a revolving gatherer provided in advance of said elevator and operating in a direction substantially at right angles to the movement of said elevator, means for driving said gatherer and said elevator from the wheel of the machine and a carrier pivoted on said wagon-box and when in a vertical position allowing the grain to fall into said box and when adjusted horizontally, diverting the grain from said box.

11. The combination, with a wheeled frame, of an elevator consisting of an inclined and a horizontal section, the latter being near the ground-line, a revolving overshot drum having a series of pick-up fingers provided above the level of said horizontal section and in advance of the same to engage the grain shocks and toss the bundles upon said horizontal section, and means for driving said elevator and said gatherer.

12. The combination, with a wheeled frame, of a grain-elevator comprising an upwardly-inclined section and a horizontal section whereon the grain is deposited, a revolving grain-gatherer provided in advance to said horizontal section and having a series of fork-like fingers or tines, gatherer-chains having fingers provided near the ends of said gatherer, and a suitable gearing connecting said elevator-belt, said revolving gatherer and gatherer-chains with a wheel of said wagon.

13. The combination, with a wheeled frame, of an elevator-belt overhanging the same on one side and comprising an inclined and a horizontal section, the latter being outside the base-line of the wheels, and a revolving gatherer having a series of curved pick-up fingers provided in advance of said horizontal section and operating substantially at right angles to the direction of movement thereof, and upon a higher plane, substantially as described.

14. The combination, with a wheeled frame, of a grain-elevator comprising an inclined and a horizontal section, the latter being near the ground-line, means overhanging said inclined section and yieldingly engaging the grain thereon, a revolving overshot gatherer provided in advance of said horizontal section and above the level of the same, and means for driving said elevator and said gatherer.

15. The combination, with a wheeled frame, of an elevator consisting of an inclined and horizontal section, the latter being near the ground-line, a revolving overshot gatherer provided in advance of said horizontal section and above the level of the same, and an elevator-belt provided between said horizontal section and said gatherer and below the level of the latter, and means for operating said belt and said gatherer.

16. The combination, with a wheeled frame, of an elevator-belt comprising an inclined and a horizontal section, the former overhanging said frame and the latter being near the ground-line and outside the base-line of the wheels, a revolving gatherer having a series of pick-up fingers provided in advance of said horizontal section, and upon a higher plane, there being an unobstructed space in front of said gatherer, and means for operating said gatherer and said belt.

17. The combination, with a wheeled frame, of an elevator-belt mounted thereon and comprising an inclined and horizontal section, a revolving overshot bundle-gatherer provided in advance of said horizontal section and arranged to pick up the bound bundles of grain, a comparatively short carrier-belt provided in the rear of said gatherer and having its discharge end overhanging said horizontal section, and a toothed elevator-belt provided between said horizontal section and said gatherer and having its receiving end below the level of the latter, for the purpose specified.

18. The combination, with a wheeled frame and a wagon-box thereon, of an elevator-belt provided at one side of said box and comprising an inclined and horizontal section, a suitable revolving gatherer provided in advance of said horizontal section the discharge end of said inclined section overhanging said box, guide-boards provided on each side of the discharge end of said inclined section, a lever provided on said wheeled frame, and a suitable mechanism connecting said lever and said guide-boards for oscillating the same to direct the grain to the forward or rear ends of said box.

19. The combination, with a wheeled frame, of an elevator-belt provided with a horizontal section arranged near the ground-line and outside the base-line of the wheels, a comparatively short belt provided in advance of said horizontal section and arranged obliquely with respect thereto and having its lower end near the ground and being provided with a series of pick-up fingers, an unobstructed space being provided in front of said belt, and means for driving said belt and said horizontal elevator-section.

In witness whereof I have hereunto set my hand this 14th day of May, 1902.

JOHN T. SMITH.

In presence of—
RICHARD PAUL,
M. C. NOONAN.